United States Patent Office 3,657,156
Patented Apr. 18, 1972

3,657,156
COBALT OXIDE CATALYSTS
Cornelius Marthinus Stander, Birchleigh, Kempton Park, Transvaal, Republic of South Africa, assignor to African Explosives and Chemical Industries Limited, Johannesburg, Transvaal, Republic of South Africa
No Drawing. Filed June 23, 1970, Ser. No. 49,194
Claims priority, application Republic of South Africa, July 4, 1969, 69/4,754
Int. Cl. B01j 11/08, 11/22
U.S. Cl. 252—466 J                    10 Claims

ABSTRACT OF THE DISCLOSURE

A process for making active cobalt oxide containing catalysts as shaped bodies comprising heating a mixture of constituents including a substance from which cobalt oxide can be formed to a first elevated temperature sufficient to produce a binding agent within the mixture, comminuting the resulting material, shaping the material into bodies and heating the shaped bodies at a second elevated temperature for a period of time sufficient to complete the reaction between the constituents.

---

The present invention relates to the manufacture of improved active cobalt oxide containing catalysts. More particularly, it relates to the production of shaped bodies of cobalt catalysts for use in industrial oxidation processes.

It is known that active cobalt oxide is an excellent catalyst for oxidation reactions but we are unaware of any discovery in the prior art leading to a practical procedure for forming this material into bodies, which are suitable for use in industrial applications.

Thermodynamic calculations show that the commonly used support materials or carriers for catalysts, such as aluminium oxide and silicon oxide, are unsuitable in combination with active cobalt oxide since the cobalt oxide reacts with these carriers at the required reaction temperatures to form cobalt aluminate and cobalt silicate. Consequently, there is a resultant loss of catalytic activity. A suitable carrier for active cobalt oxide is calcium aluminate, which is thermodynamically stable in the presence of cobalt oxide up to a temperature of about 1000° C.

Active cobalt oxide catalysts have been prepared by impregnating porous aluminium oxide bodies with solutions of calcium and cobalt salts and then heating the impregnated bodies to convert the calcium salt to calcium aluminate and the cobalt salt to active cobalt oxide. The catalytic activity of these catalysts is low since free aluminium oxide is present in the bodies and the cobalt oxide content is only about 20 percent by weight.

Active cobalt oxide catalysts have also been prepared by thermal decomposition of mixtures of nitrates of cobalt, calcium and aluminium by heating these mixtures at an elevated temperature for a period sufficient to decompose all the nitrates in the mixture and to complete the formation of calcium aluminate. These catalysts show a good activity but are in the form of a particulate material such as a powder, which cannot be formed into pills, pellets or tablets for use in industrial processes.

It is further known that a mixture of calcium aluminate and active cobalt oxide cannot be fused and ground to a suitable particle size since the active cobalt oxide is converted into inactive cobalt oxide at 950° C., which is well below the temperature at which the calcium aluminate and cobalt oxide will fuse. The melting point of calcium aluminate is about 1600° C. It is, therefore, necessary to form the calcium aluminate carrier by means of a solid state reaction at a temperature where the active cobalt oxide is stable.

It is an object of the present invention to provide active cobalt oxide containing catalysts in the form of shaped bodies having adequate mechanical strength and high activity for use in industrial processes.

It is a further object of the present invention to provide a process for making shaped catalyst bodies containing active cobalt oxide.

According to the present invention there is provided a process for making active cobalt oxide containing catalysts as shaped bodies comprising heating a mixture of constituents including a substance from which cobalt oxide can be formed to a first elevated temperature sufficient to produce a binding agent within the mixture, comminuting the resulting material, shaping the material into bodies and heating the shaped bodies at a second elevated temperature for a period of time sufficient to complete the reaction between the constituents.

The preferred substances from which cobalt oxide can be formed in the process are cobaltous nitrate and cobaltous nitrate hexahydrate. The other constituents in the mixture, preferably, are aluminium nitrate and calcium nitrate or their respective hydrates.

The mixture is heated to an elevated temperature at which temperature the nitrates of aluminium and cobalt are converted into their respective oxides, while the calcium nitrate is obtained in the anhydrous form.

This temperature shall not exceed the temperature at which calcium nitrate decomposes, which is at approximately 560° C., the minimum temperature at which decomposition occurs being approximately 200° C. Thus, the first elevated temperature is in the range of 200° C. to 560° C. and the preferred temperature is within the range of from 250° to 300° C.

The resulting material has a slightly sticky consistency caused by the presence of anhydrous calcium nitrate, which acts as a binding agent for the other constituents of the material in preparing the shaped bodies from this material.

The preparation of the shaped bodies from the material may be done by means of commonly known methods and apparatus such as, for instance, pelleting, tabletting or extrusion.

The reactions taking place at the elevated temperature may be represented as follows:

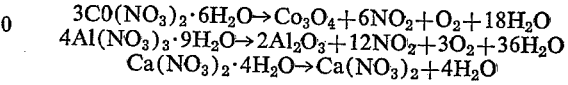

The shaped bodies are then heated to a second elevated temperature, at which temperature the calcium nitrate and aluminium oxide react to form calcium aluminate, which may be represented by the following reactions:

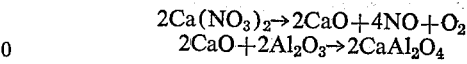

However, other calcium aluminates may be formed.

This temperature at which the shaped bodies are heated shall not exceed the temperature beyond which the catalytically active cobalt oxide, $Co_3O_4$, is converted into the inactive cobalt oxide, CoO, and this temperature is at approximately 950° C. The temperature used for this stage should be in the range of 650° C. to 950° C. but the preferred temperature is within the range of from 690° to 750° C.

The amount of carrier, that is, calcium aluminate contained in the shaped bodies, may be within the range of from 5 to 50 percent by weight of the composition, but it is preferred to maintain the calcium aluminate content within the range of from 10 to 40 percent by weight.

The ratio of calcium oxide to alumina in the carrier is preferably maintained within the range of from 1:1 to 1.3:1.

The shaped bodies obtained from the process of the invention have adequate mechanical strength for use as catalysts in industrial processes and X-ray diffraction analysis shows that the catalyst consists of a mixture of active cobalt oxide and various calcium aluminates.

The invention is further illustrated by the following examples without being restricted thereto.

EXAMPLE 1

A catalyst was prepared by heating a mixture comprising 145 grams of cobaltous nitrate, $(Co(NO_3)_2 \cdot 6H_2O)$, 95 grams of aluminium nitrate $(Al(NO_3)_3 \cdot 9H_2O)$ and 29.9 grams of calcium nitrate $(Ca(NO_3)_2 \cdot 4H_2O)$ at a temperature of 297° C. until brown fumes of nitrogen dioxide ceased to evolve, which indicated that all the nitrates of cobalt and aluminium had been converted into their respective oxides.

The resultant material was comminuted to pass through a No. 33 British Standard Sieve and then compressed into pills having a diameter of 7.5 millimeters and a height of 7.5 millimeters using a laboratory tabletting machine. The pills were heated for one hour at a temperature of 727° C. in a muffle furnace to form therein the calcium aluminate carrier from calcium nitrate and aluminium oxide.

The pills were crushed and screened to obtain granules within the size range of 1.7 to 4.0 mm.

The catalyst activity was then measured using an aggregate of granules to a bed depth of 6 cm., a 10 percent ammonia in air mixture with a space velocity of about 16,000 h.$^{-1}$ and a temperature of 650° C. The conversion efficiency to nitric oxide was found to be 91 percent.

EXAMPLE 2

A catalyst was prepared by heating a mixture comprising 241.8 grams cobaltous nitrate $(Co(NO_3)_2, 6H_2O)$, 158.1 grams aluminium nitrate $(Al(NO_3)_3 \cdot 9H_2O)$, and 49.8 grams calcium nitrate $(Ca(NO_3) \cdot 4HO)$ at a temperature of 270° C. until brown fumes of nitrogen dioxide ceased to evolve, which indicated that the nitrates of cobalt and aluminium had been converted to their respective oxides.

The resultant material was comminuted so that 80 percent passed through a No. 200 British Standard Sieve. The comminuted material was extruded to give extrusions 5 mm. in diameter and 5 mm. long. The extrusions were heated for one hour at a temperature of 700° C. in a muffle furnace to form therein calcium aluminate carrier from calcium nitrate and aluminium oxide.

The activity of the extrusions was measured using an aggregate thereof to a bed depth of 6 cm., a 10 percent ammonia in air mixture with a space velocity of about 16,000 h.$^{-1}$ and a temperature of 650° C. The conversion efficiency to nitric oxide was found to be 86 percent. No loss in activity was observed after three days of testing and on discharge the catalyst was still extremely strong and showed no signs of mechanical breakdown.

EXAMPLE 3

The methods used for preparing and testing the catalyst of this example were similar to those of Example 2. The weights of materials used in the preparation were:

|  | Grams |
|---|---|
| $Co(NO_3)_2 \cdot 6H_2O$ | 241.84 |
| $Al(NO_3)_3 \cdot 9H_2O$ | 155.3 |
| $Ca(NO_3)_2 \cdot 4H_2O$ | 51.3 | giving a molar ratio of calcium oxide to alumina of 1.05:1 in the final product.

The conversion efficiency was 88 percent.

EXAMPLE 4

This example was again similar to Example 2, and the weights of materials used in the preparation were:

|  | Grams |
|---|---|
| $Co(NO_3)_2 \cdot 6H_2O$ | 241.84 |
| $Al(NO_3)_3 \cdot 9H_2O$ | 142.76 |
| $Ca(NO_3)_2 \cdot 4H_2O$ | 58.2 | giving a molar ratio of calcium oxide to alumina of 1.3:1 in the final product.

The conversion efficiency was 85 percent.

EXAMPLE 5

The preparation of the catalyst was again similar to the method used in Example 2, except that 4 by 4 mm. extrusions were prepared. The weights of materials used in the preparation were:

|  | Grams |
|---|---|
| $Co(NO_3)_2 \cdot 6H_2O$ | 326 |
| $Al(NO_3)_3 \cdot 9H_2O$ | 47.5 |
| $Ca(NO_3)_2 \cdot 4H_2O$ | 14.9 | giving a final catalyst containing 10 percent by weight of calcium aluminate carrier. The strength of the extrusion was not as good as those containing a higher percentage of the carrier.

The activity was measured using a bed depth of 3 cm., a 10 percent ammonia in air mixture with a space velocity of about 16,000 h.$^{-1}$ and a temperature of 650° C. The conversion efficiency to nitric oxide was found to be 91 percent.

On discharge the catalyst was examined and, although it had been weak initially, no significant mechanical breakdown had occurred in the reactor.

The shaped catalyst bodies of the invention may be used with great advantage as a replacement for the platinum gauze catalyst commonly used in the oxidation of ammonia to nitric oxide but their use is not restricted to this particular application.

I claim:

1. A process for making active cobalt oxide containing catalysts as shaped bodies consisting essentially of active cobalt oxide and calcium aluminate as a support comprising heating a mixture of hydrated calcium nitrate, aluminum nitrate and a cobalt compound from which cobalt oxide can be formed to a temperature within the range of from 200° to 560° C. to form cobalt oxide and aluminum oxide and to convert the calcium nitrate to its anhydrous form so that said anhydrous calcium nitrate acts as a binding agent for the resulting material, comminuting said resulting material, shaping the material into bodies and heating the shaped bodies at a temperature within the range of from 650° to 950° C. for a period of time sufficient to complete the formation of calcium aluminate from the anhydrous calcium nitrate and the aluminum oxide formed in the first heating step, the proportions of calcium nitrate, aluminum nitrate and cobalt oxide-forming compound being such as to give a final stable composition which does not contain free aluminum oxide and consisting essentially of cobalt oxide and calcium aluminate, the aluminate comprising 5–50% by weight of the composition.

2. A process as claimed in claim 1 in which the substance in the mixture of constituents is cobaltous nitrate or cobaltous nitrate hexahydrate.

3. A process as claimed in claim 1 in which the aluminum nitrate is used in the form of its hydrate.

4. A process as claimed in claim 1 in which the first elevated temperature is within the range of from 250° to 300° C.

5. A process as claimed in claim 1 in which the second elevated temperature is within the range of from 690° to 750° C.

6. Shaped bodies of active cobalt oxide containing catalyst made according to the process of claim 1.

7. Shaped bodies as claimed in claim 6 in which the active cobalt oxide content is within the range of from 60 to 90 percent by weight.

8. Shaped bodies as claimed in claim 6 in which the ratio of calcium oxide to aluminium oxide is within the range of from 1:1 to 1.3:1.

9. A pervious catalyst bed comprising an aggregate of shaped bodies of active cobalt oxide containing catalyst as claimed in claim 6.

10. In a method for catalytically oxidizing ammonia to nitric oxide, the improvement which comprises utilizing, as the catalyst, an aggregate of shaped bodies of active cobalt oxide-containing catalyst as claimed in claim 6.

References Cited

UNITED STATES PATENTS

| | | | |
|---|---|---|---|
| 1,399,807 | 12/1921 | Scott | 23—162 |
| 2,592,016 | 4/1952 | Engel | 252—477 R |
| 2,981,751 | 4/1961 | Keith et al. | 252—466 J |
| 3,152,091 | 10/1964 | Gring | 252—466 J |
| 3,445,402 | 5/1969 | Reitmeier | 252—466 J |
| 3,478,120 | 11/1969 | Myers et al. | 252—473 X |

DANIEL E. WYMAN, Primary Examiner

W. J. SHINE, Assistant Examiner

U.S. Cl. X.R.

23—162; 252—473